June 13, 1961      R. M. MINOCK      2,988,051
LIVESTOCK OILER
Filed March 23, 1959
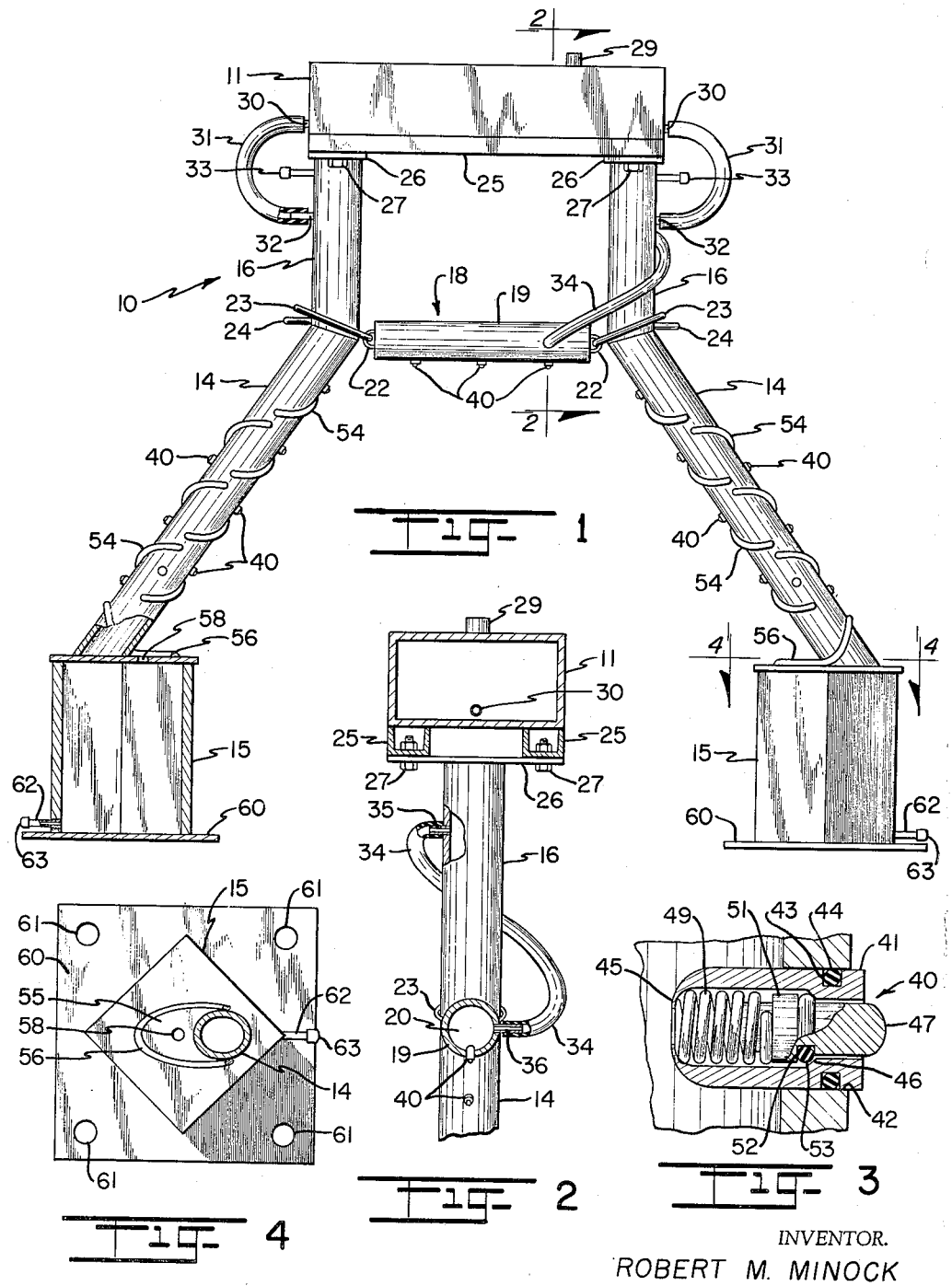
INVENTOR.
ROBERT M. MINOCK
BY
Philip H. Sheridan
ATTORNEY

United States Patent Office 2,988,051
Patented June 13, 1961

2,988,051
LIVESTOCK OILER
Robert M. Minock, 225 E. Maple Ave., Denver, Colo.
Filed Mar. 23, 1959, Ser. No. 801,114
8 Claims. (Cl. 119—157)

This invention relates to a novel and improved design and arrangement of applicating means for a livestock oiler wherein animals, such as cattle and hogs, may by rubbing themselves against the applicator surfaces automatically release insecticide and the like onto various parts of the body contacting the applicator surfaces.

It is customary practice in the application of insecticide to farm animals to employ a number of applicating surfaces disposed to receive insecticide from a common source of supply to permit servicing of a number of animals of varying heights and sizes at the same time and, in doing so, to accomplish this in such a way that the animal may contact the applicator surfaces with any desired part of the body so as to automatically release the insecticide for complete saturation of the body area contacting the applicator surfaces. As an example of the type of livestock oiler which permits complete saturation of the animal's body by automatic release means, reference is made to my co-pending patent application, Serial No. 742,145, entitled Livestock Oiler, and filed in the United States Patent Office on June 16, 1958.

In accordance with the present invention, it is proposed to provide improved applicating means conformable for use with livestock oilers such as that disclosed and shown in my above referred to patent application in order to provide for the most effective and complete saturation of the animal's body, notwithstanding the nonconformity in height and size of the animals utilizing the oiler; and furthermore, to provide for applicating means which in combination with an oiler will be very reliable and long-lasting in use, and is of a sturdy construction.

It is therefore a primary object of the present invention to provide in a livestock oiler improved means for the application of insecticide to a number of animals at one time.

It is another object to provide in a livestock oiler a novel and improved applicator arrangement which is adjustable in accordance with the height and size of the animals rubbing against the oiler, yet which is rugged and dependable in operation.

It is a further object to provide for an applicator for use in a livestock oiler which is specially designed to allow free usage by several animals at the same time, which is sturdy and rigidly mounted, and further, which will permit the controlled flow of insecticide directly onto the animal with a minimum spillage or waste of the insecticide material.

It is a still further object to provide in an applicator for a livestock oiler valve means which are self-sealing and which are automatically releasable in response to direct pressure from an animal to completely saturate the animal's body, yet with a minimum waste of insecticide.

Other features and advantages of the present invention will become more apparent from the following detailed description taken together with the accompanying drawings, and which:

FIGURE 1 is an elevational view of a livestock oiler incorporating the novel and improved features of the present invention.

FIGURE 2 is a view, partially in section, taken on line 2—2 of FIGURE 1.

FIGURE 3 is a detailed section view of a self-sealing valve member employed in the present invention; and FIGURE 4 is a sectional view taken on line 4—4 of FIGURE 1.

With more particular reference to the drawings, there is shown by way of illustrative example in FIGURE 1 a livestock oiler or dispensing unit 10, and this unit is most desireably used in the field where it is readily accessible to the animals. As set forth in more detail in my previously referred to co-pending application, the dispensing unit 10 is broadly comprised of a liquid supply reservoir or tank 11 disposed in elevated position on a frame, the frame being constituted of a number of applicator members 14 each consisting preferably of a hollow tube or conduit supported at a predetermined angle on a pedestal 15. In combination therewith, improved features of the present invention include tubular, vertically extending support members 16 forming vertical extensions of the applicators 14 and a horizontal applicator member 18 suspended between the upper ends of the conduits 14. It will, however, become evident from the foregoing description that the improved features of this invention may be employed in conjunction with other similar types of livestock oilers, although these features are particularly adaptable for use with the preferred embodiment shown in FIGURE 1.

The horizontal or overhead applicator 18 of the present invention is specially designed to provide for the positive release of insecticide onto the upper portions of the animal's body, notwithstanding the difference in height of the various animals coming into contact with the horizontal applicator. To this end, the applicator 18 is made up of a tubular member or pipe 19 provided with closed ends 20 and wherein the applicator is horizontally suspended between the upper adjacent ends of the angularly depending applicators 14 by the use of connecting means consisting preferably of hooks 22 fastened to the opposite closed ends 20 of the applicator 18 through which there are inserted adjustable loops 23 for wrapping around the cylindrical surface of the applicators at the base of the vertical support members 16. In order to limit the downward movement of the loops 23 stop means in the form of projections 24, may be provided on the outer surface of the applicators, although if desired it will be apparent that without the stop means 24 the loops will be limited in downward movement due to the divergent extension of the applicators 14 away from the vertical support members 16. In this way the loops 23, which may be suitably composed of rigid metallic wire or rubber-like rings, will be free to ride upwardly along the vertical support members 16 due to their loose connection and will only be limited by any upward projections which may be provided along the support members themselves, as desired. Accordingly, the animals engaging the under surface of the applicator will cause the horizontal applicator 18 to move upwardly and downwardly in relation to the vertical support member 16 and in a manner to be described will positively release insecticide from valve means provided on the applicator surface.

The liquid supply reservoir or tank 11 may be constructed and supported in any desired manner above the vertical support members for the purpose of supplying insecticide by gravity action to the applicators. As shown in the preferred form of FIGURES 1 and 2, the tank 11, which is generally rectangular in configuration, may be supported in spaced relation to the top surface of the support members 16 by means of channels 25 which extend in horizontal spaced relation across the front and back of the top surface of plates 26. The channels may be attached to the plates by means such as bolts 27 and the tank 11 may be allowed to merely rest on top of the channels or may be fastened to the free ends of the channels by weld or other suitable means. In order to supply insecticide from the tank 11, suitable outlets 30 may be provided at the opposite ends of the tank adjacent to the bottom, and leading from the outlets 30 are auxiliary connecting tubes 31 which are bent in semicircular fashion for extension and connection to inlets 32 provided on the side of the vertical support members 16 and which of course communicate with the interior of the support member. If desired, projecting vents 33 may be disposed on the supports 16 as shown to encourage gravity flow of the fluid through the supports 16 and applicators 14. The vertical support members in turn may be joined by means of weld or similar means to the angularly depending applicator members 14 so that as insecticide flows into the support members 16 it will continue its downward flow through the angular conduits and vertical support members are completely filled with insecticide up to the level of the inlets 32. In order to supply insecticide to the horizontal applicator 18, a flexible hose 34 is led in spiral fashion from an outlet 35, at the rear of one of the support members 16 and just beneath the inlets 32, into inlet port 36 on the front surface of the applicator so that by gravity flow the horizontal applicator 18 will be filled up to the level of the inlet by removal of insecticide from the vertical support member.

An additional feature of the present invention is the construction and disposition of valve means 40, as shown in detail in FIGURE 3, which consists of a number of valves arranged in spaced relation along the under surface of the horizontal applicator 18, and are also arranged in helical fashion in spaced relation along the conduit surfaces 14. As mentioned, the valves are specially designed to provide quick and positive release of the insecticide as the animal's body engages the applicator surfaces so as to completely saturate the contacting areas of the body and to this end, each valve includes a sleeve member 41 which is tapered slightly in a rearward direction for insertion in press fit relation into openings 42 provided along the surface of the applicators at the desired location and it will be noted that the front end of the sleeve members 41 will project slightly from the surface of the applicator. Serving to control the release of the insecticide from the valve means is a valve stem 47 provided in the hollow interior of the sleeve member 41. The sleeve 41 is generally cylindrical in configuration and includes on its exterior surface an annular groove 43 to receive an O-ring or similar seal 44 to prevent escape of the insecticide between the edge of the openings 42 and the exterior surface of the sleeve 41. At the rearward end of the sleeve an inturned flange 45 is formed and from the location of the flange the hollow interior of the sleeve is slightly enlarged then is tapered into an internal shoulder portion 46 adjacent the front end of the sleeve. In turn, a stub-nosed stem 47 is inserted within the hollow interior of the sleeve 41 and this stem includes a spring member 49 held against the inner surface of the flange 45 which normally acts to bias the stem to a closed position against the internal shoulder. Closing of the valve is accomplished by means of an enlarged shoulder 51 which is engaged by the forward end of the spring 49 so as to urge the shoulder forward toward the front end of the sleeve 41. In addition, just in front of the shoulder portion 51 there is provided an annular groove 52 on the surface of the sleeve 41 in which is positioned an O-ring 53 of sufficient diameter to snugly engage the internal shoulder portion 46 as the spring acts to force the enlarged shoulder 51 forward. It will be noted that the front end of the stem 47 is of a diameter slightly less than the reduced diameter of the hollow interior of the sleeve so that upon positive engagement of the end of the stem 47 the seal 53 will be forced rearwardly so as to form an annular space throughout the hollow interior to permit escape of the insecticide, and the insecticide will be forced outwardly by gravitational flow within the applicators.

To encourage the animals to engage the applicator surfaces, rubbing surfaces in the form of projections 54 may be provided in a well known manner along the angularly depending applicator surfaces 14. Moreover, to avoid waste of the excess insecticide flowing from the valve means 40 the projections are arranged to extend in a helical, axially spaced relation throughout the length of the applicator surfaces so as to guide the downward flow of insecticide into the pedestal members 15. Thus, each of the projections 54 may consist of a semi-circular segment and in descending relation the segments will extend first around the interior of the applicator surface, then the exterior of the applicator surface respectively so as to provide a continuous but gradual downward path for flow of the insecticide. In addition, the thickness of the projections 54 is preferably substantially equal to the distance of projection of the sleeve members 41 so that in rubbing against the projections 54 the animals will also force the stems 47 of the valve means 40 inwardly to release the insecticide.

At the base of the conduits 14, the top surface of the pedestal 15 is provided with a basin 55 which is defined by a generally oval-shaped ridge portion 56 forming a continuation of the lowermost projection 54 and extending outwardly from the base of the applicator surfaces 14. At an intermediate location in the basin, a drain opening 58 is provided to permit drainage of the excess insecticide into the hollow interior of the pedestals 15. As it will be further seen in FIGURE 4, the pedestals may be generally box-shaped in configuration although of course other similar forms may be employed and the pedestal is rested upon an enlarged base portion 60 which, if desired, may in turn be secured by means of fasteners extending through openings 61 to a suitable foundation, not shown. To permit periodic draining of the insecticide from the interior of the pedestals 15, outlets 62 may also be provided adjacent the base of the pedestals, together with plugs 63 at the outer ends of the outlets 62 which upon removal will open the outlets 62 to take off the liquid insecticide.

As the livestock move into engagement with the applicator surfaces and rub against the sides of the applicator and especially the projections 54, it will be apparent that they will of necessity also engage the valve means 40 which themselves, of course, act as scratching surfaces. As a consequence, the valve stem 47 will be pushed inwardly to release the insecticide for saturating the animal's body. In addition, as the animals move beneath the livestock oiler they will, if of sufficient height, engage the under side of the applicator and to permit movement of the animal completely through and beneath the oiler, the horizontal applicator 18 is free to slide up and down along the vertical support members 16. In doing so, of course the valve means 40 will be continually opened as the animal's body strikes the stems 47 to permit the flow of fluid onto the animal's body. In this connection, the weight of the applicator and contained insecticide should be sufficient to slightly resist upward movement caused by the animal as it engages the under side of the applicator so that the valve means 40 will be positively released. In addition, it is to be noted that the applicator 18 will permit limited swinging movement and in this way will not discourage the animals from moving or passing beneath the horizontal applicator so that the upper part of his body will come into contact therewith.

From the above description, it will thus be apparent that with respect to the improved features of the present invention in the form of the horizontal applicator 18, the self-sealing valve means 40, and together with the helically disposed axially spaced projections 54 operating to conduct the excess insecticide into the pedestals, that the overall operation and performance of the livestock oiler will be greatly improved and in a unique way. It is of course to be further understood that various modifications and changes in the improved design and arrangement of the parts forming the present invention may be made without departing from the scope of the present invention, as defined by the appended claims.

What is claimed is:

1. A dispensing unit adapted for the application of insecticide and the like for use in the treatment of livestock having a liquid supply tank, applicating means inclining downwardly and outwardly from said tank provided with insecticide releasing valve means thereon to release insecticide upon engagement by the livestock, means interconnecting said tank and said applicating means to supply insecticide to said latter means, and a horizontal insecticide dispensing applicator extending between the upper ends of said applicating means including liquid transfer means communicating with said tank and said insecticide dispensing for receiving an insecticide supply and further including loose connecting means supporting said horizontal applicator on and between said applicating means, said applicating means being so inclined that said horizontal applicator is free to ride upwardly and downwardly thereon as said horizontal applicator is engaged by the livestock.

2. A dispensing unit according to claim 1 wherein said applicating means includes stop elements to limit the downward movement of said horizontal applicators.

3. A dispensing unit according to claim 1 wherein said applicating means are each defined by an elongate tubular member having a vertical extension at its upper end to support the loose connecting means for said horizontal applicator thereon.

4. In a dispensing unit adapted for the application of insecticide and the like for use in the treatment of livestock having a liquid supply tank and a pair of applicator members inclining downwardly and outwardly below said tank provided with insecticide releasing valve means therein to release insecticide upon engagement by the livestock, the combination of a pair of vertical support members disposed between said applicator members and said tank, a horizontal insecticide dispensing applicator extending between the upper ends of said applicator members including loose connecting means supporting said horizontal applicator on and between said vertical support members, said horizontal applicator being free to ride upwardly and downwardly on said vertical support members as said horizontal applicator is engaged by the livestock, and liquid transfer means communicating with said tank and said applicators to supply insecticide to said applicators.

5. In a dispensing unit adapted for the application of insecticide and the like for use in the treatment of livestock having a liquid supply tank, a pair of elongate applicator members inclining downwardly and outwardly below said tank provided with insecticide releasing valve means therein to release insecticide upon engagement by the livestock together with a hollow base support member for each of said applicator members to receive the excess insecticide delivered by said valve means, the combination of a pair of vertically extending cylindrical support members disposed between said applicator members and said tank having means communicating with said tank to supply insecticide to said applicator members, a horizontal insecticide dispensing applicator extending between the upper ends of said applicator members including liquid transfer means communicating with said tank for receiving an insecticide supply and further including loose connecting means to support said horizontal applicator on and between said vertical support members, said horizontal applicator being free to ride upwardly and downwardly on said vertical support members as said horizontal applicator is engaged by the livestock.

6. In a dispensing unit according to claim 5 wherein said horizontal applicator is defined by an elongate closed tubular member having valve means spaced along the underside thereof, said valve means being responsive to engagement by the cattle to release insecticide thereon.

7. In a dispensing unit according to claim 5 wherein said inclined applicator members include a series of helically extending projecting surfaces on the exterior thereof serving as scratching surfaces and to aid in the delivery of excess insecticide on the surfaces of said applicator members to said base support members.

8. In a dispensing unit according to claim 7 wherein said valve means for said inclined and horizontal applicators is defined by a series of valve members, each valve member comprising a hollow sleeve extending through an opening in said applicator, said sleeve being reduced in diameter adjacent the ends thereof and constituting an internal shoulder, and a spring biased stem disposed in said sleeve including an enlarged seal normally biased against said internal shoulder, said stem being responsive to engagement by the livestock to displace said seal from said shoulder so as to open said valve for the gravity flow of insecticide therefrom.

References Cited in the file of this patent

UNITED STATES PATENTS

| | | |
|---|---|---|
| 1,174,135 | Farrar | Mar. 7, 1916 |
| 1,216,081 | Cox | Feb. 13, 1917 |
| 1,300,297 | Randall | Apr. 15, 1919 |
| 1,627,516 | Larson | May 3, 1927 |
| 2,581,028 | Kirk | Jan. 1, 1952 |
| 2,663,284 | Stonesifer | Dec. 22, 1953 |

FOREIGN PATENTS

| | | |
|---|---|---|
| 779,581 | Great Britain | July 24, 1957 |